United States Patent
Palmer et al.

(10) Patent No.: US 8,798,071 B2
(45) Date of Patent: Aug. 5, 2014

(54) SELECTIVE ROUTING TO GEOGRAPHICALLY DISTRIBUTED NETWORK CENTERS FOR PURPOSES OF POWER CONTROL AND ENVIRONMENTAL IMPACT

(75) Inventors: Matthew Palmer, Menlo Park, CA (US); Kent A. Watsen, Leesburg, VA (US)

(73) Assignee: Juniper Networks, Inc., Sunnyvale, CA (US)

( * ) Notice: Subject to any disclaimer, the term of this patent is extended or adjusted under 35 U.S.C. 154(b) by 32 days.

(21) Appl. No.: 13/600,998

(22) Filed: Aug. 31, 2012

(65) Prior Publication Data
US 2013/0003743 A1 Jan. 3, 2013

Related U.S. Application Data

(63) Continuation of application No. 12/691,044, filed on Jan. 21, 2010, now Pat. No. 8,259,586, which is a continuation of application No. 11/852,736, filed on Sep. 10, 2007, now Pat. No. 7,653,009.

(51) Int. Cl.
*H04L 12/28* (2006.01)
*H04L 12/56* (2006.01)

(52) U.S. Cl.
CPC ................. *H04L 45/00* (2013.01); *H04L 45/127* (2013.01)
USPC .................... 370/395.21; 370/401

(58) Field of Classification Search
USPC ............ 370/238, 389, 395.31, 395.32
See application file for complete search history.

(56) References Cited

U.S. PATENT DOCUMENTS

| | | | |
|---|---|---|---|
| 4,641,126 A | 2/1987 | Crowe | |
| 4,939,726 A | 7/1990 | Flammer et al. | |
| 5,317,566 A | 5/1994 | Joshi | |
| 6,460,005 B1 | 10/2002 | Chang | |
| 6,810,367 B2 | 10/2004 | Barnard | |
| 6,904,275 B2 | 6/2005 | Stanforth | |
| 7,400,903 B2 | 7/2008 | Shoemake et al. | |
| 7,653,009 B2 | 1/2010 | Watsen et al. | |
| 7,742,830 B1 | 6/2010 | Botes | |
| 8,259,586 B2 | 9/2012 | Watsen et al. | |

(Continued)

FOREIGN PATENT DOCUMENTS

| | | |
|---|---|---|
| EP | 1324545 A1 | 7/2003 |
| EP | 1931113 A1 | 6/2008 |
| WO | 0042786 A1 | 7/2000 |

OTHER PUBLICATIONS

Extended European Search Report dated Mar. 4, 2009, for corresponding Application No. 08251819.2, 8 pp.

(Continued)

*Primary Examiner* — Alvin Zhu
(74) *Attorney, Agent, or Firm* — Shumaker & Sieffert, P.A.

(57) ABSTRACT

In general, this disclosure describes techniques of selecting routes for network packets through a computer network based, at least in part, on electrical power procurement arrangements of devices in the computer network. A computing system includes a hardware processor and a database storing power procurement profiles. Each of the power procurement profiles stores data indicating an arrangement between an operator of one or more of routing devices to procure electrical power from a utility company for facilities in which the routing devices are located. The power procurement profiles are mapped to ranges of network addresses associated with the facilities for retrieval of the power procurement profiles for the routers based on the network addresses assigned to the routers.

16 Claims, 5 Drawing Sheets

(56) References Cited

U.S. PATENT DOCUMENTS

| | | |
|---|---|---|
| 2002/0184065 A1 | 12/2002 | Menard et al. |
| 2006/0126514 A1 | 6/2006 | Lee et al. |
| 2006/0143583 A1 | 6/2006 | Diab et al. |
| 2006/0182033 A1 | 8/2006 | Chen et al. |
| 2006/0192434 A1 | 8/2006 | Vrla et al. |
| 2008/0075007 A1 | 3/2008 | Mehta et al. |
| 2009/0002151 A1 | 1/2009 | Ferri et al. |
| 2009/0012633 A1 | 1/2009 | Liu et al. |
| 2009/0034419 A1 | 2/2009 | Flammer, III et al. |
| 2009/0088221 A1 | 4/2009 | Gilbert et al. |
| 2009/0122797 A1 | 5/2009 | Thubert et al. |
| 2009/0195396 A1 | 8/2009 | Ballester Merelo et al. |
| 2010/0072318 A1 | 3/2010 | Westenberger |
| 2010/0153680 A1 | 6/2010 | Baum et al. |
| 2010/0161368 A1 | 6/2010 | Dawson et al. |
| 2011/0082597 A1 | 4/2011 | Meagher |

OTHER PUBLICATIONS

Office Action dated Dec. 12, 2009, for corresponding European Application No. 08251819.2, 4 pp.

Office Action dated Mar. 7, 2012, for corresponding Chinese Application No. 200810093201.5, 4 pp.

Office Action dated Aug. 24, 2012, for corresponding Chinese Application No. 200810093201.5, 7 pp.

SELECTIVE ROUTING TO GEOGRAPHICALLY DISTRIBUTED NETWORK CENTERS FOR PURPOSES OF POWER CONTROL AND ENVIRONMENTAL IMPACT

This application is a continuation of U.S. application Ser. No. 12/691,044 filed Jan. 21, 2010 which is a continuation of Ser. No. 11/852,736 filed Sep. 10, 2007, and issued Jan. 26, 2010 as U.S. Pat. No. 7,653,009, the entire contents of both being hereby incorporated herein by reference.

TECHNICAL FIELD

The invention relates to computer networks and particularly to routing of network packets in computer networks.

BACKGROUND

Telecommunications companies that provide data communication services may operate networks that include routers scattered throughout the world or a geographic region. When a device sends a network packet on such a network, one or more of the routers in the network may direct the network packet along a physical path through the network. In this way, the network packet eventually arrives at an intended destination device.

Routers select how to direct network packets based on one or more routing metrics. For example, a router may use network congestion as a routing metric. In this example, the router may determine that a particular network packet should be directed along a particular path based on the relative network congestion of potential paths. In a second example, a router may use the number of hops in a route as a routing metric. In this second example, the router may determine that a particular network packet should be directed along a particular path based on the relative number of hops along paths between the router and the destination device.

SUMMARY

In general, this disclosure describes techniques of selecting routes for network packets through a computer network based, at least in part, on electrical power procurement arrangements of devices in the computer network. When operating, routers and other network devices consume electrical power. For large organizations that operate a large numbers of routers and other network devices, the costs associated with paying for the electrical power consumed by the routers and other network devices may be considerable. Moreover, the amount of electrical power consumed by a network device generally increases as the network device processes more network packets.

As described herein, there may be a plurality of routes through a computer network from a first device to a second device. Each of these routes may include one or more devices that consume electrical power. A route selection device may make a determination regarding how network packets are to be routed among these routes based, at least in part, on arrangements made to procure the electrical power consumed by the devices along the routes. After the route selection device makes this determination, the route selection device may cause network packets to be routed among these routes in accordance with this determination.

The techniques described in this disclosure may provide several applications. In a first example, the techniques described in this disclosure may be used to reduce financial costs associated with electrical power consumption. For instance, routers and other network devices consume more electricity as these devices process more network packets. In this first example, a router may direct the network packet along a route from the router to a destination device when total financial costs associated with electrical power consumed by devices on the route are less than total financial costs associated with electrical power consumed by devices on other routes between the router and the destination device. In a second example, the techniques described in this disclosure may be used to favor consumption of electrical power from specific sources or generated in specific ways. In this second example, an enterprise may define policies that favor electrical power generated from renewable sources (e.g., wind power) relative to energy generated from non-renewable sources (e.g., coal). Furthermore, in this second example, a router may direct the network packet along a route from the router to a destination device when devices along the route consume electrical power from sources that are more favored than the sources of electrical power consumed by devices along other routes from the router to the destination device.

In one example, a method comprises receiving, with a route selection device, a power procurement profile of a first device in a network. The power procurement profile of the first device indicates an arrangement between an operator of the first device and an energy provider to procure electrical power for a facility in which the first device is located. The power procurement profile of the first device indicates a manner in which the energy provider generates the electrical power for the facility. The method also comprises automatically selecting, with the route selection device, routes through the network for network packets based, at least in part, on the manner in which the energy provider generates the electrical power provided to the facility. In addition, the method comprises automatically causing, with the route selection device, the network packets to be directed along the selected routes.

In another example, a route selection device comprises a set of one or more network interfaces. The route selection device also comprises a computer-readable medium storing routing information representative of a topology of a network. In addition, the route selection device comprises a computer-readable medium storing set of power procurement profiles for routing devices geographically distributed within the network. Each of the power procurement profiles indicates a manner in which an energy provider generates energy provided to a facility in which the respective routing device is located. Furthermore, the route selection device comprises a route selection module that (i) automatically selects routes that traverse the routing devices of the network based, at least in part, on the manner in which the energy providers generate the electrical power provided to the facilities in which the routing devices are located, and (ii) automatically causes network packets to be directed along the selected routes.

In another example, a computer-readable medium comprises instructions. When executed by one or more programmable processors of a route selection device, the instructions cause the one or more programmable processors to store a power procurement profile of a first device that is in a network. The power procurement profile of the first device indicates an arrangement between an operator of the first device and an energy provider to procure electrical power for a facility in which the first device is located. The power procurement profile of the first device indicates a manner in which the energy provider generates the electrical power provided to the facility. The instructions also cause the one or more programmable processors to automatically select routes through the network for network packets based, at least in part, on the manner in which the energy provider generates the electrical power provided to the facility. Furthermore, the instructions cause the one or more programmable processors to automatically cause the network packets to be directed along the selected routes.

In another example, a system comprises a first device that is located in a facility. In addition, the system comprises a router. The router comprises a set of one or more network interfaces. One or more network interfaces in the set of network interfaces receives a power procurement profile of the first device. The power procurement profile of the first device indicates a manner in which the energy provider generates the electrical power for the facility. Network interfaces in the set of network interfaces are associated with one or more routes that traverse a network. A network interface in the set of network interfaces receives network packets. The router also comprises a control unit executing a route selection module that (i) automatically selects ones of the routes based, at least in part, on the manner in which the energy provider generates the electrical power provided to the facility, and (ii) automatically causes the network packets to be directed along the selected routes.

In another example, a system comprises a communications network, a first data center that is connected to the communications network, a second data center that is connected to the communications network, and a client device. Furthermore, the system comprises a plurality of intermediate devices located in respective facilities. There exists a first route through the communications network from the client device to the first data center and there exists a second route through the communications network from the second device to the second data center. One or more of the intermediate devices are located on the first route or the second route. The system also comprises a route selection device. The route selection device comprises a database storing power procurement profiles of the intermediate devices. Each of the power procurement profiles indicates an arrangement between an operator of the respective intermediate device and one or more energy providers to procure electrical power for a facility in which the respective intermediate device is located. The power procurement profiles indicate manners in which the energy providers generate the electrical power provided the facilities. The route selection device also comprises a route selection module that, in response to receiving a request from the client device, (i) automatically makes a determination regarding whether to direct network packets from the client device along the first route or along the second route based, at least in part, on the manners in which the energy providers generate the electrical power for the facilities that include the intermediate devices located along the first route and the second route, (ii) automatically selects either a network address of the first data center or a network address of the second data center based on the determination, (iii) formulates a response that specifies the selected network address, and (iv) sends the response to the second device.

As another example, a computing system includes a hardware processor and a database storing power procurement profiles. Each of the power procurement profiles stores data indicating an arrangement between an operator of one or more of routing devices to procure electrical power from a utility company for facilities in which the routing devices are located. The power procurement profiles are mapped to ranges of network addresses associated with the facilities for retrieval of the power procurement profiles for the routers based on the network addresses assigned to the routers.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
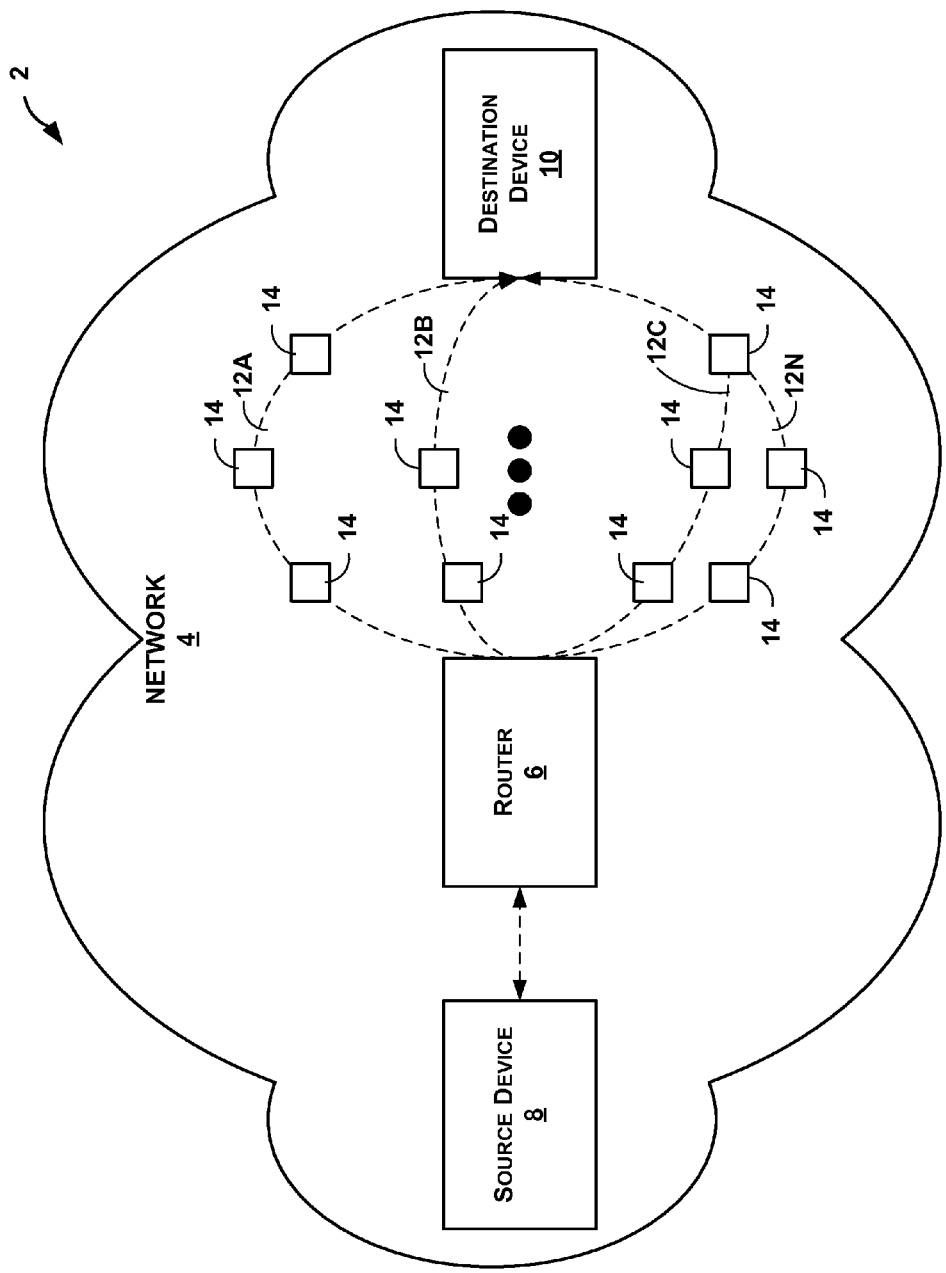
FIG. 1 is a block diagram illustrating an exemplary computer network system.

FIG. 1 is a block diagram illustrating an exemplary computer network system 2. In the example of FIG. 1, system 2 includes a network 4. Network 4 is a data communications network that includes a plurality of devices operated by one or more operators. These operators may be telecommunications companies, Internet service providers ("ISPs"), public or private enterprises, government entities, educational institutions, non-governmental organizations, individual people, or other persons or organizations that operate network devices. FIG. 1 is shown for purposes of example, and the technique may readily be extended to network environments in which numerous networks are coupled so as to collectively span significant geographic regions. For example, the techniques described herein may readily be applied to the Internet, which is a collection of interconnected networks that provide global access to the World Wide Web and a wide variety of other services.

As illustrated in the example of FIG. 1, network 4 includes a router 6 that receives network packets from a source device 8. System 2 also includes a destination device 10. When router 6 receives a network packet from source device 8, router 6 examines information within the packet and forwards the network packet to destination device 10 via one of routes 12A through 12N (collectively, "routes 12"). Each of routes 12 may include one or more intermediate devices 14. Intermediate devices 14 may include routers, gateways, network switches, firewall devices, load balancers, hubs, bridges, satellites, personal computers, network servers, mobile devices, or other devices that receive and forward network packets. Furthermore, two or more of routes 12 may include a common one of intermediate devices 14. As illustrated in the example of FIG. 1, route 12C and route 12N include a common one of intermediate devices 14. Moreover, as mentioned above, one or more intermediate public or private networks may also be traversed along one or more of routes 12.

Source device 8 and destination device 10 may be a wide variety of network devices. For example, source device 8 and/or destination device 10 may be personal computers, routers, firewall devices, mobile telephones, personal digital assistants, network switches, laptop computers, television set top boxes, servers, video game devices, or other types of network devices. Router 6 may be a standalone router or another type of route selection device that performs other functions in addition to the routing techniques described in this disclosure. For instance, router 6 may also perform bridging functions, switching functions, firewall functions, intrusion detection functions, virtual private networking functions, or other network functions. Router 6 may be a customer edge router, a service provider edge router, a core router or any other type of device that provides routing functionality, such as layer three (L3) routing functionality in accordance with the OSI network model.

Each device in network 4 (i.e., router 6, source device 8, destination device 10, intermediate devices 14, etc.) requires electrical power in order to operate. In order to provide the electrical power required by one of the devices in network 4, the operator of the device may make an arrangement with an energy provider to procure electrical power for a facility in which the device is located. In this way, the energy provider provides the electrical power consumed by the device. The energy provider and the operator may be units of a common entity (e.g., enterprise) or may be wholly or partially separate.

Operators and energy provides may make a wide variety of electricity procurement arrangements. In a first example, an operator may arrange to pay a public utility company a specific amount of money in return for each kilowatt-hour of electricity provided by the public utility company. In a second example, an operator may arrange to generate its own electricity and to use some or all of the generated electricity to power a device in network 4. In a third example, an operator may generate some of its own electricity and arrange to pay a public utility company for the rest of the electricity that the operator may require. In a fourth example, a single operator may operate geographically distributed devices located at different physical sites, e.g., a first device in network 4 that is located in Ohio and a second device in network 4 that is located in Minnesota. In this fourth example, this operator may make a first electricity procurement arrangement in order to procure electrical power for the first device and may make a second electricity procurement arrangement in order to procure electrical power for the second device. The first electricity procurement arrangement and the second electricity procurement arrangement may be different. For instance, the first electricity procurement arrangement may be an agreement with an Ohio public utility company and the second electricity procurement arrangement may be an agreement with a Minnesota public utility company. In addition to the electricity procurement arrangements of these examples, many other electricity procurement arrangements may be possible.

In accordance with the techniques described herein, router 6 uses information regarding the electricity procurement arrangements made by operators of intermediate devices 14 to make a determination regarding how to direct network packets received by router 6 that are destined for destination device 10 on routes 12. For example, router 6 may receive information regarding the electricity procurement arrangements made by operators of intermediate devices 14. This information may be provided manually to router 6 by one or more administrators. Alternatively, router 6 may automatically receive the information using one or more network protocols. For example, a routing protocol may be extended so as to define fields for exchanging such information by way of a peering session. Example routing protocols include a link state routing protocol such as the Interior Gateway Protocol ("IGP") or the Open Shortest Path First ("OSPF") routing protocol. Other example routing protocols include the Border Gateway Routing Protocol ("BGP"). The power procurement profiles for routing devices may be included in conventional routing messages that are used to communicate topology information between routers. Changes to the power procurement profiles may trigger a routing protocol update message in a manner similar to a topology change to network 4.

In any event, router 6 may then use the power procurement profiles for intermediate devices 14 to construct a route table that includes entries listing the available routes 12 through network 4. Each of the entries in the route table may map network destinations (e.g., network prefixes) to known routes 12. Based on the route table, router 6 generates forwarding information that maps network destinations to output interfaces of router 6. When router 6 receives a network packet that specifies a destination IP address, router 6 utilizes the forwarding information to select an output interface and forwards the network packet to the next intermediate device 14 along the selected route, i.e., the next hop. This one of intermediate devices 14 may then forward the network packet along one of routes 12 in a similar manner such that the network packet eventually reaches destination device 10. In this way, router 6 automatically causes the network packet to be directed along one of routes 12 in accordance with the determination.

In accordance to the techniques described herein, router 6 may maintain an extended route table that includes power procurement profiles for intermediate devices 14 along routes 12. When performing route resolution with a routing protocol (i.e., when processing the route table to select forwarding information to resolve destinations to specific output interfaces to next hops), router 6 also takes into the power procurement profiles for the intermediate devices 14 along each of the routers 12 so as to select routes in accordance with the policies defined by the enterprise.

As discussed in the examples below, the techniques described in this disclosure may be utilized advantageously in a variety of situations. For example, the techniques described in this disclosure may be utilized by an enterprise to lower the overall amount the enterprise pays for electrical power. Router 6 may, for example, apply policies that route packets along intermediate nodes of the enterprise that either consume less power or have advantageous power procurement arrangements. In another example, the techniques described in this disclosure may be utilized by an enterprise to reduce the overall amount of pollution released into the environment that is attributable to the generation of electrical power consumed by network devices operated by the enterprise. Router 6 may, for example, apply policies to select routes along which the intermediate devices procure increased portions of power from environmentally friendly sources (e.g., solar, wind, tidal, wave, biofuels, hydroelectric, geothermal and the like). This may be especially advantageous in light of current and future governmental efforts to reduce greenhouse gas emissions.

Figure 2:
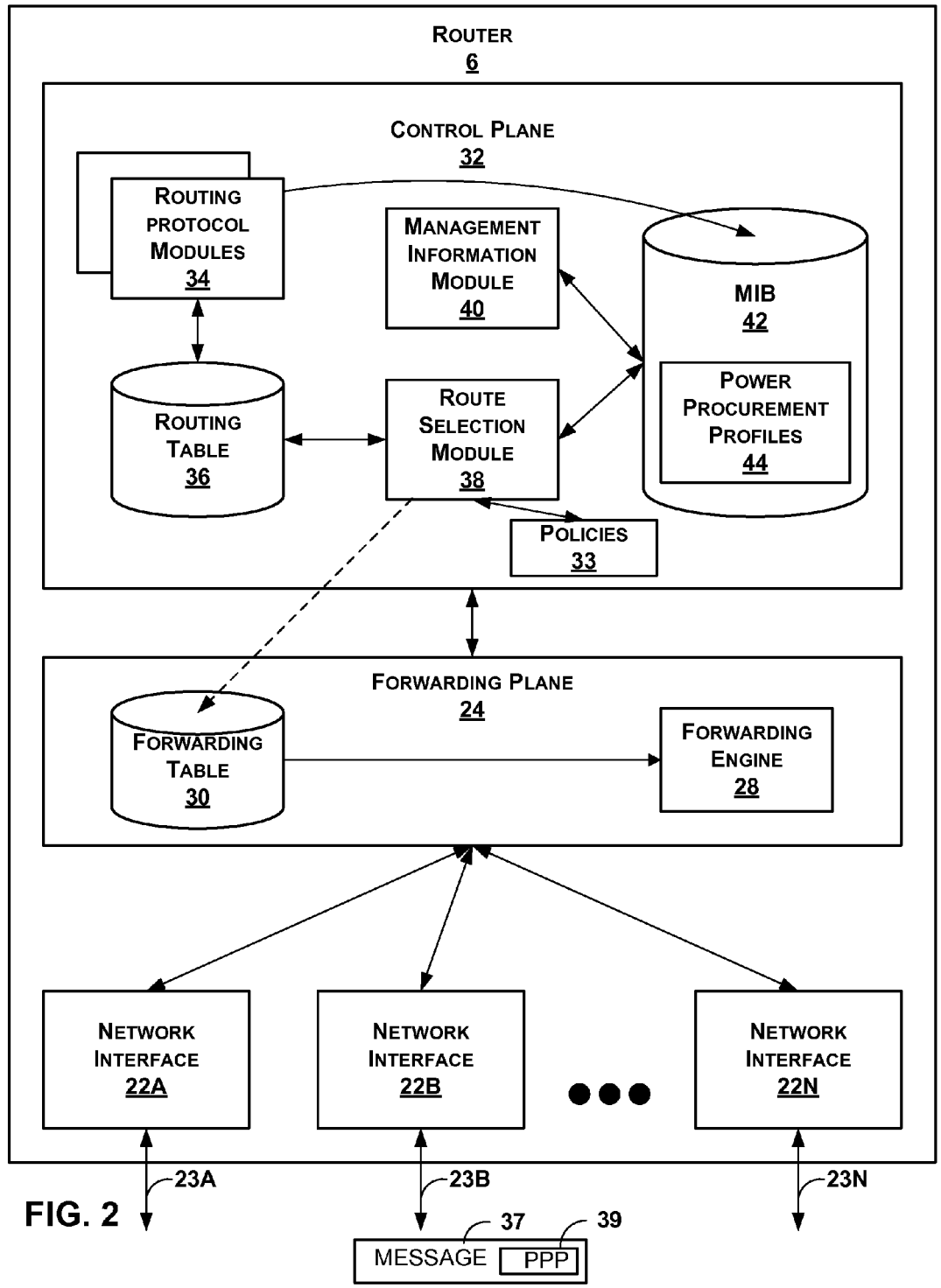
FIG. 2 is a block diagram illustrating exemplary details of a router in the system of FIG. 1.

FIG. 2 is a block diagram illustrating example details of router 6 (FIG. 1). As illustrated in the example of FIG. 2, router 6 includes a set of network interfaces 22A through 22N (collectively, "network interfaces 22"). Each of network interfaces 22 may be connected to one or more neighboring devices via one of network links 23A through 23N (collectively, "network links 23"). For example, network interface 22A may be an Ethernet network interface card, an asynchronous transfer mode ("ATM") interface, a fiber optic interface or other connection. Each of network links 23 may be one of several types of media, including Ethernet cables, fiber optic links, wireless media, coaxial cables, satellite links, power line communication links, and other types of network connections.

When one of network interfaces 22 receives a network packet, the network interface may forward the network packet to a forwarding plane 24 in router 6. When forwarding plane 24 receives a network packet, a forwarding engine 28 in forwarding plane 24 may use a forwarding table 30 to determine how to forward the network packet. For example, forwarding table 30 may include entries that map network destinations (e.g., network prefixes) to ones of network interfaces 22 or to a control plane 32 within router 6. In this example, when forwarding engine 28 receives a network packet, forwarding engine 28 may identify an entry in forwarding table 30 that maps the network destination specified by the network packet to one of network interfaces 22 or to control plane 32. Forwarding engine 28 may then forward the network packet to the one of network interfaces 22 or to control plane 32 as specified by the identified entry in forwarding table 30. In an alternate implementation of router 6, each of network interfaces 22 may include a copy of forwarding table 30 and each of network interfaces 22 may include a module that performs the functionality of forwarding engine 28.

In the example of FIG. 2, a route selection module 38 in control plane 32 manages entries in forwarding table 30. For instance, route selection module 38 may create new entries in forwarding table 30, delete entries from forwarding table 30, or edit existing entries in forward table 30. Route selection module 38 may manage entries in forwarding table 30 based on network topology information stored in a routing table 36 in control plane 32.

More specifically, routing table 36 includes data that represents the topology of all or a portion of a network, e.g., network 4 of FIG. 1, including routes through the network. Each entry in routing table 36 may, for example, specify an available route (e.g., A→B→C→D→E, where A, B, C, D, and E are nodes within the network). In addition, each entry includes route cost data which may reference power procurement profiles for each of the nodes along the route. In the example of FIG. 2, a management information base ("MIB") 42 in router 6 may store the power procurement profiles.

Router 6 includes routing protocol modules 34. Each of routing protocol modules 34 implements one or more routing protocols (e.g., BGP, OSPF and IS-IS) that update routing table 36 based on communications with other routing devices. For example, a given one of routing protocol modules 34 that implements the BGP may communicate with other BGP peer routers within the network by exchanging BGP messages in accordance with the BGP routing protocol. Other ones of routing protocol modules 34 may exchange routing information with other routing devices. In this way, router 6 learns of available routes through the network and updates routing table 36 to reflect the network topology. For instance, routing protocol modules 34 may create new entries in routing table 36, delete entries from routing table 36, or edit existing entries in routing table 36 based on routing information learned from other routing devices within the network.

Route selection module 38 performs route resolution by processing route table 36 to select amongst the available routes and resolve network destinations to specific ones of output interfaces 22. Route selection module 38 produces entries in forwarding table 30 that map the network destinations to specific ones of output interfaces 22 that are connected via network links 23 to next hops along the selected routes. Route selection module 38 installs forwarding table 30 within forwarding plane 24 to control forwarding of packets via router 6.

When performing route selection and when generating forwarding information 30, route selection module 38 takes into consideration the power procurement profiles for the intermediate devices 14 along each of the router 12 so as to select routes in accordance with the policies 33 defined by the enterprise. For example, route selection module 38 may automatically make a determination regarding how to direct network packets along routes 12 based, at least in part, on power procurement profiles of devices (e.g., routers) in network 4.

As used in this disclosure, a power procurement profile of a device is a set of information that indicates an electricity procurement arrangement for the facility in which the particular device is located. In this manner, the power procurement profile describes the arrangement between an operator of the facility and an energy provider to procure electrical power consumed by the device and optionally other devices within the facility or service center. The power procurement profile of a device may include a set of parameters that indicate various aspects of an electricity procurement arrangement between an operator of the device and an energy provider to provide electrical power for the facility or data center in which the device is located. For instance, the parameters may define cost of power during time and/or date periods, e.g., a first one of these parameters may, for instance, specify that an operator of the device pays $0.06 per kilowatt-hour between 6:30 AM and 7:00 PM and a second one of these parameters may specify that the operator of the device pays $0.04 per kilowatt-hour between 7:00 PM and 6:30 AM. Moreover, the parameters may indicate a manner in which the energy provider generates the electrical power for the facility. For example, the parameters may provide an indication of the amount (e.g., percent) of the power that the facility received from environmentally friendly sources and an identification of the manner in which each source generates the (e.g., 15% facility from solar power, 20% from wind and 65% from conventional coal-based energy sources). As another example, the parameters may provide a rating for each power source, e.g., a rating indicative of the environmental impact for generation of each unit of power. In some cases, standard types of electricity procurement arrangements may be associated with standardized index numbers defined by an enterprise, an industry, or a governmental agency. In this case, a power procurement profile of a device may include an index number associated with one of the standard types of electricity procurement arrangements.

Power procurement profiles for router 6 and other devices within the network may be obtained in a variety of ways. In one embodiment, an administrator of router 6 may use a management information module 40 to manually configure MIB 42 to store a power procurement profile for router 6 itself and optionally other devices within the network. In one implementation, management information module 40 may be a Simple Network Management Protocol ("SNMP") module that receives a power procurement profile from the administrator as one or more SNMP messages.

As another example, power procurement profiles for router 6 and other devices within the network may be obtained automatically from a centrally accessible database that provides power procurement profiles of devices. This centrally accessible database may be maintained by an enterprise, an industry, one or more governmental agencies, or another type of database operator. The power procurement profiles may be mapped to ranges of network addresses associated with the facilities, thereby allowing router 6 to retrieve the power procurement profiles for devices based on the network addresses associated with the devices.

As another example, routing protocol modules 34 may utilize extended versions of routing protocols that enable routers to exchange power procurement profiles by way of peering sessions. For example, routing protocol modules 34 may utilize extended version of IGP, OSPF, BGP, or other routing protocols to exchange power procurement profiles by way of peering sessions. Power procurement profiles (PPPs) 39 may be included in conventional routing messages 37 that are used to communicate topology and/or link-state information between routers. Changes to the power procurement profile for a device may trigger a routing protocol update message in a manner similar to a topology or link-state change to network 4. In this case, routing protocol modules 34 may update routing table 36 with any topology changes and may update MIB 42 to record the power procurement profiles of the devices.

As yet another example, a Layer 2 protocol may be used to automatically exchange power procurement profiles. For example, route selection module 38 may determine which devices in network 4 are directly connected to each of network interfaces 22. Router 6 may implement a device discovery protocol to determine which devices in network 4 are directly connected to each of network interfaces 22. For instance, router 6 may use a Layer 2 Link Layer Discovery Protocol ("LLDP") to determine which devices in network 4 are directly connected to each of network interfaces 22. In accordance with the LLDP, router 6 may output LLDP data units on a periodic basis. These outbound LLDP data units may specify the power procurement profile of router 6 stored in MIB 42. Furthermore, in accordance with the LLDP, router 6 may receive LLDP data units from devices in network 4 that neighbor router 6. The inbound LLDP data units received by router 6 may specify power procurement profiles of the devices that sent the LLDP data units. In this way, router 6 may obtain power procurement profiles for each device that neighbors router 6 as well as determining which devices in network 4 are directly connected to each of network interfaces 22. Router 6 may store the power procurement profiles of the devices that neighbor router 6 in MIB 42.

Routing table 36 may take the form of a graph that represents network 4. Each node in this graph may represent a device in network 4. Each edge in this graph may represent a network connection between two devices in network 4. Furthermore, route selection module 38 may calculate a "cost" for each edge in the graph. Route selection module 38 may use a variety of routing metrics to calculate the cost for an edge in the graph. One or more of these routing metrics are based on the power procurement profiles of devices in network 4. Other routing metrics may be based on bandwidths of network connections, reliability of network connections, delay, load, sizes of maximum transmission units permitted on the network connection.

Route selection module 38 may use the costs of edges in the graph to select a path from router 6 to each other device in network 4. For instance, route selection module 38 uses the costs of edges between intermediate devices 14 to select one of routes 12 from router 6 to destination device 10. Because the power procurement profiles indicate electricity procurement arrangements and because the costs of edges in the graph are at least somewhat based on the power procurement profiles, router 6 routes network packets based, at least in part, on the electricity procurement arrangements of intermediate devices 14. Once route selection module 38 has selected a path from router 6 to another device in network 4, route selection module 38 may create an entry in routing table 36 that specifies the IP address of the device as the destination address and that specifies an IP address of a first device on the selected path as the next-hop address.

Route selection module 38 may use the power procurement profiles to calculate the costs of edges in the graph in a variety of ways. For example, power procurement profiles for intermediate devices 14 may specify an amount of money operators of intermediate devices 14 pay per kilowatt-hour of electricity consumed by intermediate devices 14. In addition, power procurement profiles for intermediate devices 14 may specify how many kilowatt-hours of electricity intermediate devices 14 consume when processing a network packet. In this example, route selection module 38 may use this information to select the one of routes 12 that would result in the lowest overall monetary cost to transmit a network packet from router 6 to destination device 10.

To further illustrate this example, consider that there may be three intermediate devices on route 12A. An operator of the first one of intermediate devices 14 on route 12A pays $0.10 per kilowatt-hour and the first one of intermediate devices 14 consumes 0.0001 kilowatt-hours when processing a network packet. An operator of the second one of intermediate devices 14 on route 12A pays $0.09 per kilowatt-hour and the second one of intermediate devices 14 consumes 0.0001 kilowatt-hours when processing a network packet. An operator of the third one of intermediate devices 14 on route 12A pays $0.11 per kilowatt-hour and the third one of intermediate devices 14 consumes 0.0001 kilowatt-hours when processing a network packet. In this example, the total monetary cost to send a network packet on route 12A is $0.00003. If the total monetary cost to send a network packet on route 12B is $0.00004, calculated in a similar fashion, route selection module 38 may select route 12A rather than route 12B because route 12A is associated with a lower total monetary cost than route 12B.

Selecting a route based on total monetary cost may be especially useful in situations where utility companies charge a lower rate per kilowatt-hour during "off-peak" times when demand for electricity is generally lower. For instance, a public utility company may charge $0.09 per kilowatt-hour between the hours of 6:30 AM and 7:00 PM and may charge $0.06 per kilowatt-hour between the hours of 7:00 PM and 6:30 AM. The power procurement profiles of ones of intermediate devices 14 that receive power from public utility companies that charge lower rates during "off-peak" times may reflect these different rates. Consequently, the costs that router 6 associates with routes 12 may vary throughout the course of a day. As a further consequence, when destination device 10 is geographically located on the other side of the Earth from router 6, router 6 may generally select one of routes 12 that traverses the night side of the Earth in order to take advantage of the "off-peak" rates for electricity that generally coincide with nighttime hours. For a large organization with locations scattered around the Earth, taking advantage of "off-peak" rates may result in significant monetary cost savings.

In another example, power procurement profiles for intermediate devices 14 may indicate the methods by which the electrical power consumed by the devices is generated. For instance, the operator of one of intermediate devices 14 on route 12A may have arranged to procure electrical power from a particular public utility company for the facility in which the device is located. This public utility company may derive 50% of its electrical output from coal, 25% of its electrical output from nuclear fission, and 25% of its electrical output from renewable sources (e.g., biomass, wind, solar, tidal, wave, biofuels, hydroelectric, geothermal, etc.). By obtaining such power procurement profiles from ones of intermediate devices 14 on routes 12, route selection module 38 may be able to characterize each of routes 12 based on the power generation methods used to power the ones of intermediate devices 14 on each of routes 12.

In this example, route selection module 38 may then make a determination about how to direct network packets on routes 12 based, at least in part, on these characterizations in view of defined policies. For instance, 30% of the electrical power consumed by ones of intermediate devices 14 on route 12A may be derived from renewable sources and 40% of the electrical power consumed by ones of intermediate devices 14 on route 12B may be derived from renewable sources. For a variety of reasons, an enterprise that operates network 4 or router 6 may prefer electrical energy derived from renewable sources. For example, the enterprise may wish to reduce its "carbon dioxide footprint" by preferentially using electrical energy derived from renewable sources. An enterprise's "carbon dioxide footprint" is the net amount of carbon dioxide that the enterprise is directly or indirectly responsible for releasing into the Earth's atmosphere. An enterprise may wish to reduce its "carbon dioxide footprint" in order to comply with government regulations (e.g., regulations relating to the prevention of global warming), out of a sense of civic responsibility, or other motivations. In addition, under a so-called "cap-and-trade" system, a government may issue a fixed number of pollution credits to an enterprise each year. Under this "cap-and-trade" system, the enterprise may expend these credits by causing pollutants (e.g., carbon dioxide) to be released into the environment. The enterprise may sell any unused credits to enterprises that release more than their allotted shares of pollutants into the environment. Hence, under this "cap-and-trade" system, it may be in the interest of the enterprise to reduce the amount of pollutants that the enterprise is responsible for releasing into the environment. Accordingly, the enterprise may configure route selection module 38 to select the one of routes 12 that is characterized by having devices that consume the highest percentage of electrical energy derived from sources that release the lowest amounts of pollutants into the environment.

Furthermore, a power procurement profile of a device may further indicate the sources of fuels used to generate the electric power consumed by the facility in which the device is located. For example, a power procurement profile of a device may indicate that electricity used to power the device is derived from fuels exported by an unfriendly nation or a nation that does not comply with environmental, labor, human rights, or other political considerations. In this example, the operator of router 6 may select one of routes 12 based on the source of fuels used to generate the electric power consumed by ones of intermediate devices 14 along routes 12. For instance, the operator of router 6 may cause router 6 to preferentially select one of routes 12 when ones of intermediate devices 14 along that one of routes 12 consume less electricity produced from fuels from unfriendly nations.

Although not discussed in detail in the foregoing examples, it should be appreciated that route selection module 38 may use other information aside from power procurement profiles of intermediate devices 14 when calculating costs associated with links between intermediate devices 14. For example, router 6 may use power procurement profiles as one factor in a hierarchy of factors used to make a determination regarding how to direct network packets on routes 12. In this example, router 6 may first determine whether routes 12 have the same number of hops. If one of routes 12 has fewer hops than the other ones of routes 12, router 6 may select this one of routes 12. However, if two or more of routes 12 have the lowest number of hops, router 6 may determine which one of these routes has the greatest average bandwidth. If two or more of these routes have the greatest average bandwidth, router 6 may, based on the power procurement profiles, determine which one of these routes is associated with the lowest average rates for electrical power. Alternatively, higher preference may be given to the power procurement profiles.

Figure 3:
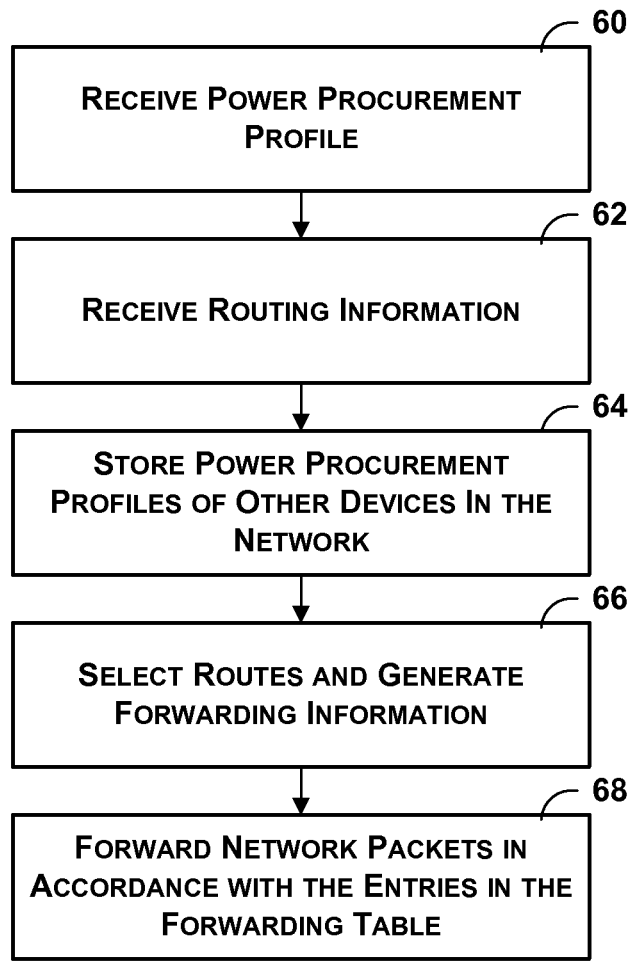
FIG. 3 is a flowchart illustrating an exemplary operation of the router of FIG. 2.

FIG. 3 is a flowchart illustrating an example operation of router 6. In the example operation illustrated in FIG. 3, management information module 40 in router 6 receives a power procurement profile of router 6 that indicates an arrangement between an operator of router 6 and an energy provider to procure electrical power for a facility in which router 6 is located (60). In a first example, management information module 40 may receive the power procurement profile of router 6 in the form of one or more SNMP messages. In a second example, management information module 40 may receive the power procurement profile of router 6 in the form of an extensible markup language ("XML") file via the File Transfer Protocol ("FTP"), the Hypertext Transfer Protocol ("HTTP"), or another network protocol. In a third example, router 6 may retrieve the information from a centrally accessible database based on a network address assigned to the router by the administrator.

Next, routing protocol modules 34 of router 6 receive routing information from other routers within the network and update routing table 36 in accordance with the received routing information (62). In addition, management information module 40 is either manually or automatically updated to store power procurement profiles of other devices in network 4 (64). Route selection module 38 may receive the power procurement profiles of other devices in network 4 in the same routing protocol messages that provides topology information for network 4. Alternatively, route selection module 38 may receive the power procurement profiles of other devices in network 4 using a different protocol. In any case, router 6 may store the power procurement profiles of other devices and their facilities in the set of power procurement profiles 44 in MIB 42.

Next, route selection module 38 may use the network topology information and the power procurement profiles to perform route selection and generate forwarding table 30 based on the topology described in routing table 36 and power procurement profiles 44 (66). For example, route selection module 38 may use the power procurement profiles to assign costs to edges in the graph described by the routing information within routing table 36. In this example, route selection module 38 may then use the costs assigned to the edges in the graph to select routes from router 6 to destinations within the network.

After route selection module 38 creates the entries in routing table 36, route selection module 38 installs forwarding table 30 within forwarding plane 24, thereby causing router 6 to route network packets in accordance with the selected routes (68).

Although not illustrated in the example of FIG. 3, management information module 40 may receive updated power procurement profiles of router 6 and other devices in network 4. For instance, management information module 40 may receive updated power procurement profiles of router 6 on a periodic or irregular basis. In another instance, management information module 40 may receive an updated power procurement profile from another device in network 4 when the power procurement profile of the other device is updated. When management information module 40 receives an updated power procurement profile, route selection module 38 may perform route selection and generate forwarding table 30 based on the topology described in routing table 36 and based, at least in part, on the updated power procurement profile.

Figure 4:
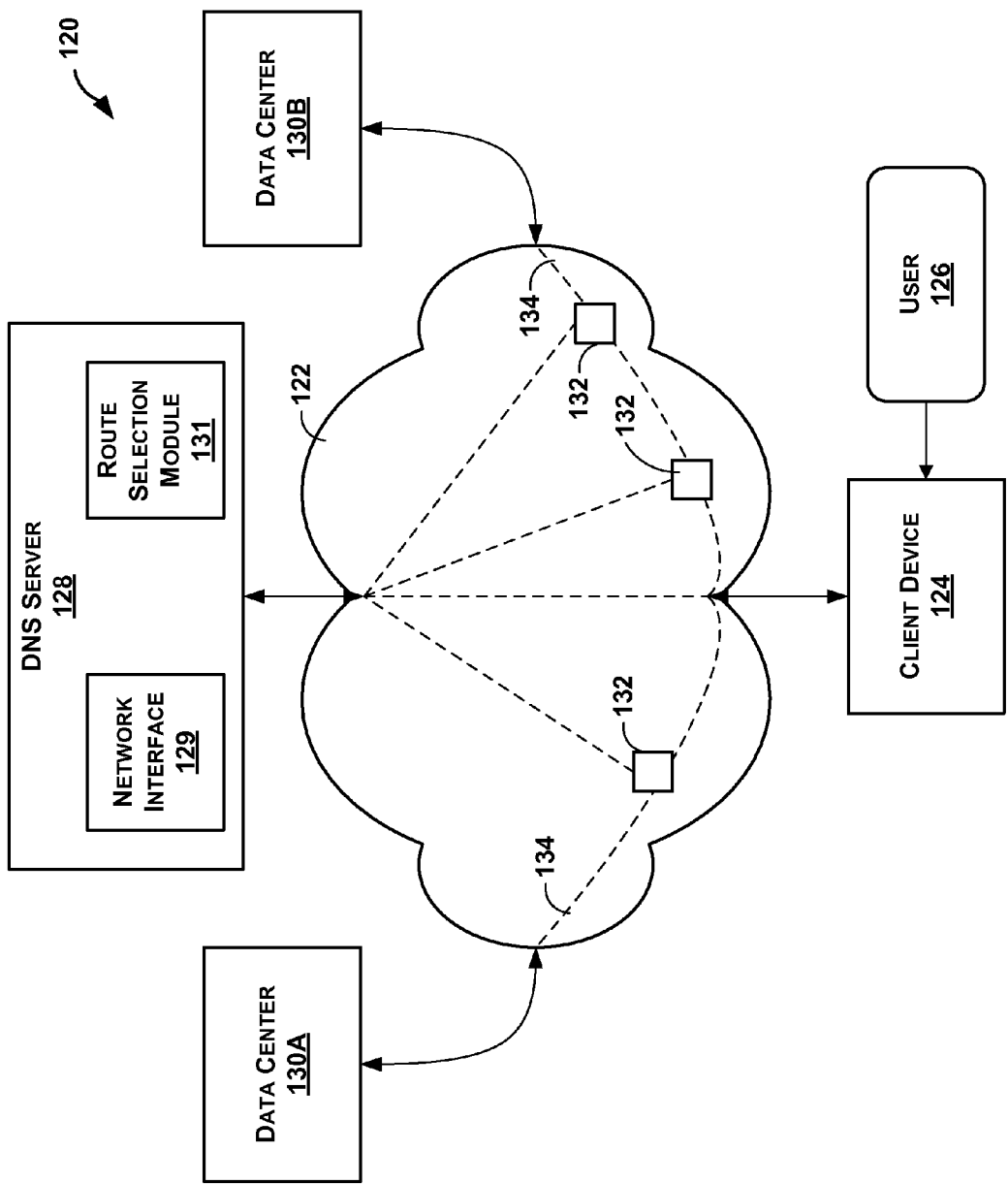
FIG. 4 is a block diagram illustrating an alternate exemplary computer network system.

FIG. 4 is a block diagram illustrating an alternate exemplary computer network system 120. As illustrated in the example of FIG. 4, system 120 includes a network 122. Network 122 may be a variety of different types of networks. For example, network 122 may be a wide-area network, such as the Internet. In another example, network 122 may be a localarea network, a metropolitan area network, or another type of network. Furthermore, network 122 may include both wired and wireless links.

As illustrated in the example of FIG. 4, two separate data centers may be coupled to network 122. In the example of FIG. 4, these data centers are labeled data center 130A and data center 130B (collectively, "data centers 130"). As used in this disclosure, a data center is a specialized facility that houses network devices that provide network services or data services. In its most simple form, a data center may consist of a single geographical location having a plurality of network devices. A more sophisticated data center can be an organization spread throughout the world with subscriber support equipment located in various physical hosting facilities. Data centers may allow enterprises to provide a number of different types of services, including e-commerce services to customers; extranets and secure virtual private networks ("VPNs") to employees and customers; firewall protection and Network Address Translation ("NAT") services, web caching as well as many others. These services can all be provided at an off-site facility in the data center without requiring the enterprise to maintain the facility itself.

In the example of FIG. 4, a client device 124 is coupled to network 122. Client device 124 may be a personal computer, a network server, a mobile handheld device, a video game platform, a television set top box, a network device integrated into a vehicle, a network kiosk, a laptop computer, a network appliance, an intermediate network device, or another type of network device. Client device 124 may execute a web browser application. When a user 126 enters a Universal Resource Locator ("URL") into an address bar of the web browser application, client device 124 may output a Domain Name System ("DNS") request on network 122. This DNS request may be addressed to a DNS server 128 and may contain a request to obtain an IP address for the URL that user 126 entered into the address bar of the web browser application.

In the example of FIG. 4, DNS server 128 is coupled to network 122. When a network interface 129 in DNS server 128 receives the DNS request from client device 124, a route selection module 131 in DNS server 128 selects an Internet Protocol ("IP") address associated with the URL, generates a DNS response that specifies the selected IP address, and sends the DNS response back to client device 124. When client device 124 receives the DNS response, client device 124 may then use the IP address specified in the DNS response to communicate with a resource identified by the URL that user 126 entered into the address bar of the web browser application.

When responding to a DNS request, route selection module 131 may select an IP address from a pool of IP addresses that correspond to a requested URL. Data center 130A may be associated with a first IP address and data center 130B may be associated with a second IP address. However, data center 130A and data center 130B may provide a common network resource. For example, data center 130A and data center 130B may both provide access to a single web site. In this example, when responding to a DNS request to resolve the URL associated with data centers 130, route selection module 131 may select either the IP address associated with data center 130A or the IP address associated with data center 130B and output a DNS response that specifies this selected IP address.

Route selection module 131 may select an IP address from a pool of IP addresses that correspond to a requested URL based, at least in part, on electricity procurement arrangements of data centers 130. In order to select an IP address based on the electricity procurement arrangements of data centers 130, DNS server 128 may receive power procurement profiles of both of data centers 130. DNS server 128 may receive the power procurement profiles of data centers 130 in a variety of ways. For example, an administrator of DNS server 128 may explicitly provide the power procurement profiles of data centers 130 to DNS server 128. In another example, DNS server 128 may receive routing protocol messages or other network messages that specify the power procurement profiles of data centers 130.

Route selection module 131 may use the power procurement profiles in a variety of ways depending on what information is indicated by the power procurement profiles. For example, the power procurement profiles of data centers 130 may specify when a public utility company charges "off-peak" rates. In this example, route selection module 131 may select one of data centers 130 that is currently drawing power at "off-peak" rates. In a second example, the power procurement profile of data center 130A may indicate that an operator of data center 130A procures a significant portion of the power consumed by data center 130A from solar collectors. In this second example, route selection module 131 may select the IP address of data center 130A when data center 130A is on the day side of Earth. In this way, route selection module 131 may take advantage of the solar collectors that provide the electricity that data center 130A consumes. This may help reduce the "greenhouse gas footprint" of an organization that operates DNS server 128. Greenhouse gasses are gasses that contribute to global warming (i.e., the "greenhouse effect.") Known greenhouse gasses include carbon dioxide, methane, nitrous oxide, ozone, and other gasses.

In addition, route selection module 131 may select an IP address from the pool of IP addresses that correspond to the request URL based, at least in part, on electricity procurement arrangements of intermediate devices 132 along routes 134A and 134B (collectively, "routes 134") from client device 124 to data centers 130. That is, DNS server 128 may maintain routing information in a manner similar to router 6 of FIG. 2 and direct client 124 to one of data centers 130 based on power procurement characteristics for intermediate devices along routes between client device 124 and data centers 130.

DNS server 128 may receive power procurement profiles of intermediate devices 132 in a variety of ways. For example, DNS server 128 may receive power procurement profiles of intermediate devices 132 in a way that is similar to the example operation of router 6 of FIGS. 1-3. For example, DNS server 128 may receive routing protocol messages that convey topology information as well as specify power procurement profiles of devices in network 122. Furthermore, in this example, route selection module 131 may create a graph that represents network 122. Route selection module 131 may then calculate costs associated with routes from client device 124 to each of data centers 128 and then identify routes 134 based on these costs. Next, route selection module 131 may use the power procurement profiles of intermediate devices 132 along routes 134 to determine which one of routes 134 has preferred power consumption characteristics. Route selection module 131 may then provide client device 124 with the IP address of the one of data centers 130 that is associated with the selected one of routes 134.

In a second example, routes 134 may be determined in advance. For instance, an enterprise may establish routes 134 using traffic engineering techniques. In this example, the enterprise may also provide power procurement profiles of intermediate devices 132 to DNS server 128. In this second example, route selection module 131 may use the power procurement profiles of intermediate devices 132 to dynamically determine whether to select the IP address of data center 130A or the IP address of data center 130B.

Figure 5:
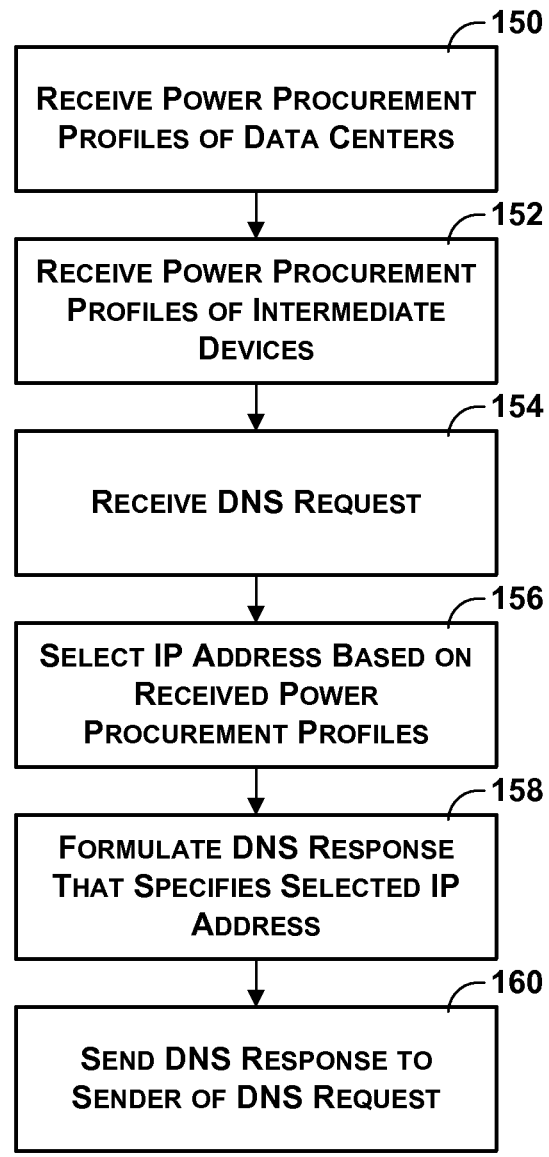
FIG. 5 is a flowchart illustrating an exemplary operation of a Domain Name System server in the computer network system of FIG. 4.

FIG. 5 is a flowchart illustrating an exemplary operation of DNS server 128 of FIG. 4. Initially, DNS server 128 receives power procurement profiles of data centers 130 (150). As discussed above, DNS server 128 may receive the power procurement profiles of data centers 130 in a variety of ways. In addition, DNS server 128 may receive power procurement profiles of intermediate devices 132 on routes 134 (152). Although not illustrated in the example of FIG. 5, DNS server 128 may receive power procurement profiles of data centers 130 on multiple occasions. For instance, DNS server 128 may receive an updated power procurement profile of one of data centers 130 whenever the power procurement profile of the one of data centers 130 changes.

After receiving the power procurement profiles, network interface 129 in DNS server 128 may receive a DNS request from client device 124 (154). This DNS request may request that DNS server 128 resolve an IP address for a URL associated with data centers 130. When DNS server 128 receives this DNS request, route selection module 131 in DNS server 128 selects an IP address of one data centers 130 based, at least in part, on the received power procurement profiles for the data centers and/or the intermediate devices between the particular client device and the data centers (156). For instance, route selection module 131 may select the IP address based only on the power procurement profiles of data centers 130. Alternatively, route selection module 131 may select the IP address based, at least in part, on only the power procurement profiles of intermediate devices 132. In yet another alternative, route selection module 131 may select the IP address based on both the power procurement profiles of data servers 130 and the power procurement profiles of intermediate devices 132. In this way, route selection module 131 uses the power procurement profiles to make a determination regarding how to direct network packets along routes 134. Furthermore, route selection module 131 may use other factors in addition to power procurement profiles when selecting the IP address. For instance, these other factors may include relative processing load of data centers 130, the relative distances between client device 124 and data centers 130, and other factors.

When route selection module 131 has selected an IP address, route selection module 131 may formulate a DNS response that specifies the selected IP address (158). Next, route selection module 131 may send the DNS response to client device 124 (160). Once client device 124 receives the DNS response, client device 124 may use the IP address specified in the DNS response when attempting to communicate with one of data centers 130. When client device 124 uses the IP address of data center 130A, network packets outputted by client device 124 may traverse route 134A. Similarly, when client device 124 uses the IP address of data center 130B, network packets outputted by client device 124 may traverse route 134B. In this way, route selection module 131 causes network packets to travel along a route due to the determination made by route selection module 131 based on the received power procurement profiles.

The techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory ("RAM") such as synchronous dynamic random access memory ("SDRAM"), read-only memory ("ROM"), non-volatile random access memory ("NVRAM"), electrically erasable programmable read-only memory ("EEPROM"), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more general purpose microprocessors, digital signal processors ("DSPs"), application-specific integrated circuits ("ASICs"), field programmable logic arrays ("FPGAs"), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder ("CODEC").

Various embodiments of the invention have been described. These and other embodiments are within the scope of the following claims.

The invention claimed is:

1. A system comprising:
a computing system having a hardware processor and a database storing power procurement profiles,
wherein each of the power procurement profiles stores data indicating an arrangement between an operator of one or more of routing devices and a utility company to procure electrical power from the utility company for powering facilities in which the routing devices are located,
wherein the power procurement profiles are mapped to ranges of network addresses associated with the facilities for retrieval of the power procurement profiles based on the network addresses assigned to the routers.

2. The system of claim 1, wherein the database is a centrally accessible database maintained by a governmental agency for a plurality of different energy providers.

3. The system of claim 1, wherein the database is a maintained by the utility company.

4. The system of claim 1, wherein the computing system communicates the power procurement profiles to the routers based on the network addresses assigned to the routers.

5. The system of claim 1, wherein the power procurement profiles are communicated to the routers by routing protocol messages in accordance with a routing protocol.

6. The system of claim 1, wherein each of the power procurement profiles indicates a type of fuel used by the utility company to generate the electrical power for the facilities that houses the routing devices to which the power procurement profile is mapped.

7. The system of claim 1, wherein each of the power procurement profiles indicates environmental effects associated with the generation of the electrical power for the facilities that houses the routing devices to which the power procurement profile is mapped.

8. The system of claim 1, wherein the environmental effects include relative amounts of greenhouse gasses released when the utility companies generated the electrical power provided to the facilities.

9. The system of claim 1, wherein each of the routers comprise:
- a set of one or more network interfaces;
- at least one routing protocol process executing on a processor, wherein the routing protocol process receives routing protocol messages in a network in accordance with a routing protocol, wherein the routing protocol messages including one or more of the power procurement profiles;
- a route selection module that selects routes that traverse the routing devices of the network based, at least in part, on the power procurement profiles; and
- a packet forwarding engine that forwards network packets along the selected routes.

10. The system of claim 9, further comprising a non-transitory computer-readable medium storing a plurality of policies that define enterprise preferences for selecting routes based on the power procurement profiles mapped to the routers along the routes.

11. The system of claim 9, wherein the route selection module automatically selects the routes at least in part by (i) constructing a graph of the network based on topology information indicated by the routing protocol messages, wherein nodes in the graph represent the routers and edges in the graph represent network links between devices in the network; (ii) calculating costs of edges in the graph based, at least in part, on the type of fuels used by the utility company to generate the electrical power provided to the routers as specified by the power procurement profiles; (iii) using the costs of the edges to calculate costs associated with one or more routes in the set of routes; and (iv) selecting a lowest-cost route in the set of routes, wherein the lowest-cost route is associated with a cost that is less than costs associated with other routes in the set of routes.

12. The system of claim 9, wherein the routing protocol comprises a link state routing protocol.

13. The system of claim 9, wherein the routing protocol comprises one of the Interior Gateway Protocol ("IGP"), the Open Shortest Path First ("OSPF") routing protocol, or the Border Gateway Routing Protocol ("BGP").

14. The system of claim 1, wherein the computing system comprises a domain name system (DNS) server.

15. The system of claim 1, wherein the DNS server selects a network address to which to resolve a Universal Resource Locator ("URL"), wherein the DNS servers selects the network address by computing a cost for reaching the network address based on the power procurement profiles.

16. The system of claim 1, wherein the facilities comprises data centers.

* * * * *